INVENTOR.
HYMAN M. HARRIS
BY
Wheeler, Wheeler & Wheeler
ATTORNEYS

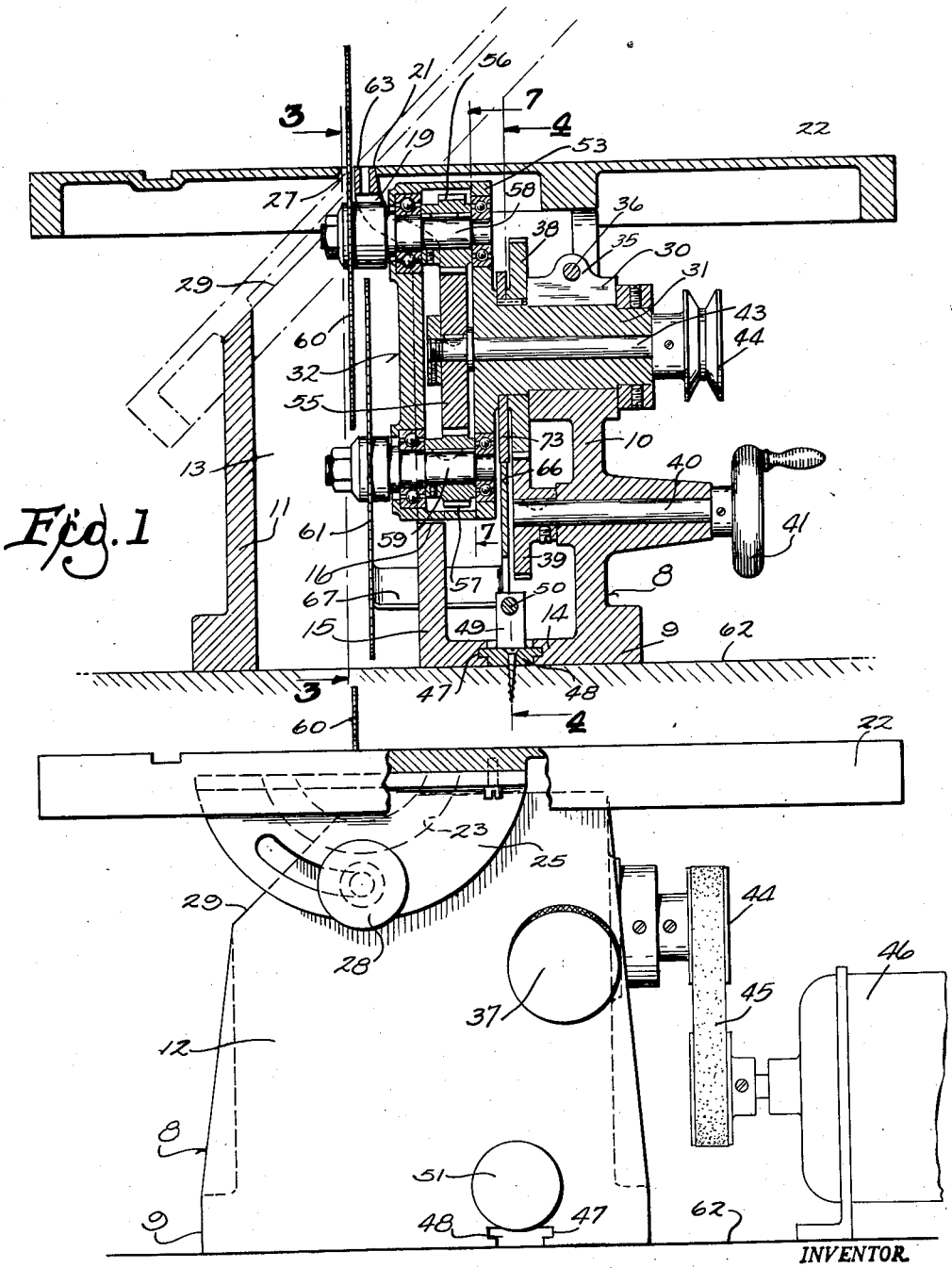

Aug. 15, 1950     H. M. HARRIS     2,518,684
DUPLEX BENCH SAW

Filed April 21, 1949     3 Sheets-Sheet 3

INVENTOR.
HYMAN M. HARRIS
BY
Wheeler, Wheeler & Wheeler
ATTORNEYS

Patented Aug. 15, 1950

2,518,684

UNITED STATES PATENT OFFICE 2,518,684

DUPLEX BENCH SAW

Hyman M. Harris, Green Bay, Wis.

Application April 21, 1949, Serial No. 88,800

16 Claims. (Cl. 143—45)

1

This invention relates to a duplex bench saw.

It is the primary object of the invention to provide a compact bench saw having both rip saw and cross cut blades mounted for indexing movements selectively to position for use, the organization being nevertheless so compact that the saw can be used on top of a conventional bench, instead of requiring a separate stand. It will, of course, be understood that the invention may also be embodied in saws equipped with stands. It has, however, been exemplified in a bench saw where it has particular utility.

More specifically stated, it is an object of the invention to provide for compactness in a saw of this kind by axially offsetting and lapping the saw disks so that the overall height of the device, to the level of the saw table, only slightly exceeds the diameter of one of the disks. In order to achieve this compact organization and still provide adequate support for the work, I provide, in effect, two separate slots in the table with a partition strip between them for work support. In view of the axial offset in the positions of the respective blades, the table slot would have to be unduly wide if both blades were accommodated in the same slot.

Other objectives of the invention pertain to the provision of an automatically operative splitter which rises and recedes according to the adjustment of the sub-frame which indexes the rip saw to and from position of use, and to other details of construction which are shown more particularly in the accompanying drawings, wherein:

Fig. 1 is a view in cross section through a bench saw embodying my invention.

Fig. 2 is a view of my improved bench saw in handle elevation, portions thereof being broken away to expose parts of the table in cross section.

Figure 3:
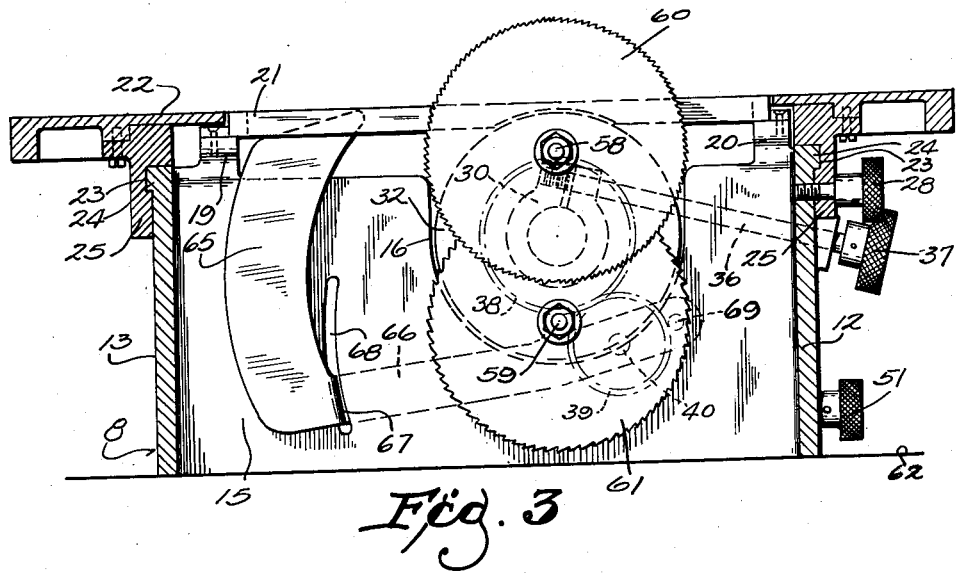
Fig. 3 is a view taken in transverse section on the line 3—3 of Fig. 1.

The main frame 8 may be cast in one piece and may take the form of a housing having a base at 9 from which arises a front wall 10, rear wall 11 and end walls 12 and 13. The bottom wall 14 extends rearwardly from the front

2 wall 8 to an intermediate point within the housing, where it integrally joins a partition wall 15 which has at 16 an opening for the sub-frame hereinafter described and which, near its upper end, has rearwardly offset arms 19 and 20 supporting the slotted partition element 21 through which may be projected for use the rip saw hereinafter to be described.

Figure 6:
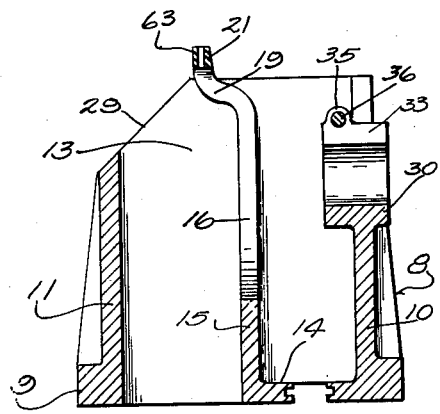
Fig. 6 is a detail view taken in section on the line 6—6 of Fig. 4 through the frame only.

The end walls 12 and 13 and the table 22 have complementary arcuate channel and flange connections 23, 24, the channels being formed in wings 25 extending downwardly from the table adjacent the end walls. The arcuate ways thus provided accommodate tilting adjustment of the table between the full line position of Fig. 1 and the dotted line position in which the table is indicated in that view, the ways extending arcuately about an axis of adjustment which is disposed substantially at table level and extends longitudinally of the table slot 27 in which the slotted guide member 21 is disposed as best shown in Fig. 1. Beside the guide member, the slot 27 is open to receive the cross cut saw hereinafter to be described. One or more clamping nuts 28 (Fig. 3) engage the segment wings 25 to hold the table releasably in any desired tilting adjustment. The rear wall 11 and the end walls 12 and 13 of the main frame are beveled at 29 (Figs. 1, 2 and 6) to accommodate the tilting movement of the table.

Figure 5:
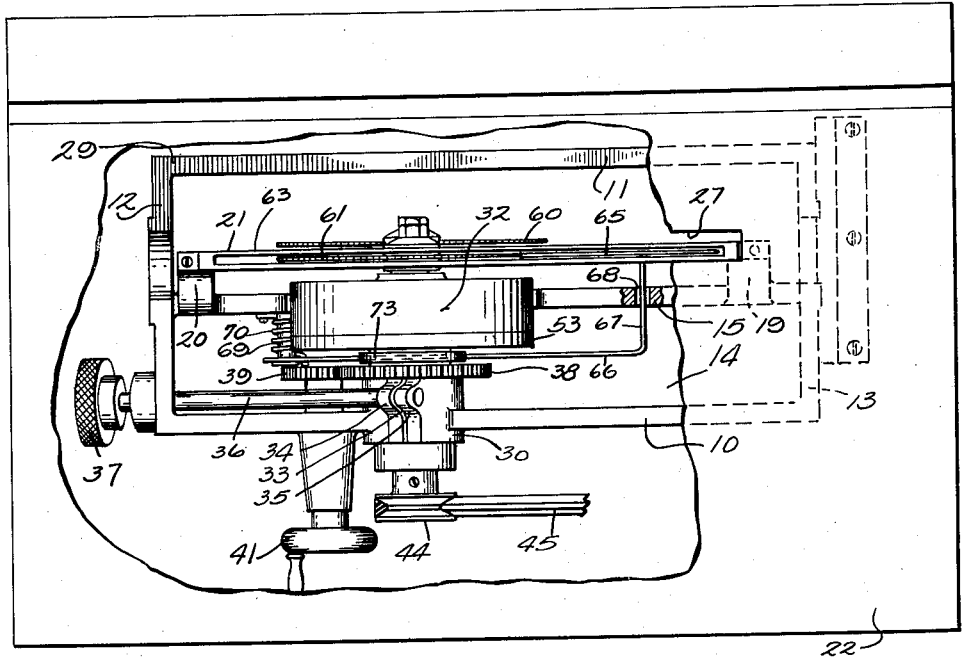
Fig. 5 is a view in plan, with the table broken away to expose the underlying structure.
Figure 7:
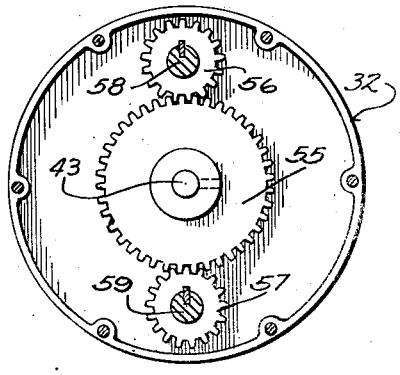
Fig. 7 is a view taken in section through the indexing sub-frame on the line 7—7 of Fig. 1.

The front wall 10 is provided intermediate its ends with a bearing and clamp 30 for the hub portion 31 of an indexing sub-frame 32. The bearing functions as a clamp by reason of the fact that it has a slot at 33 and upstanding ears 34, 35 at opposite sides of the slot, the latter being tapped to receive the clamp bolt 36 which is guided in the end wall 12 and provided with a knurled head at 37 for its manual operation (see Figs. 1, 3 and 5). For indexing the sub-frame housing 32, when the clamping pressure of bearing 30 is relieved, the hub 31 has keyed to it, adjacent the bearing, a gear 38 with which meshes pinion 39 on shaft 40, the said shaft being provided with a cranked hand wheel 41 for its adjustment.

Figure 4:
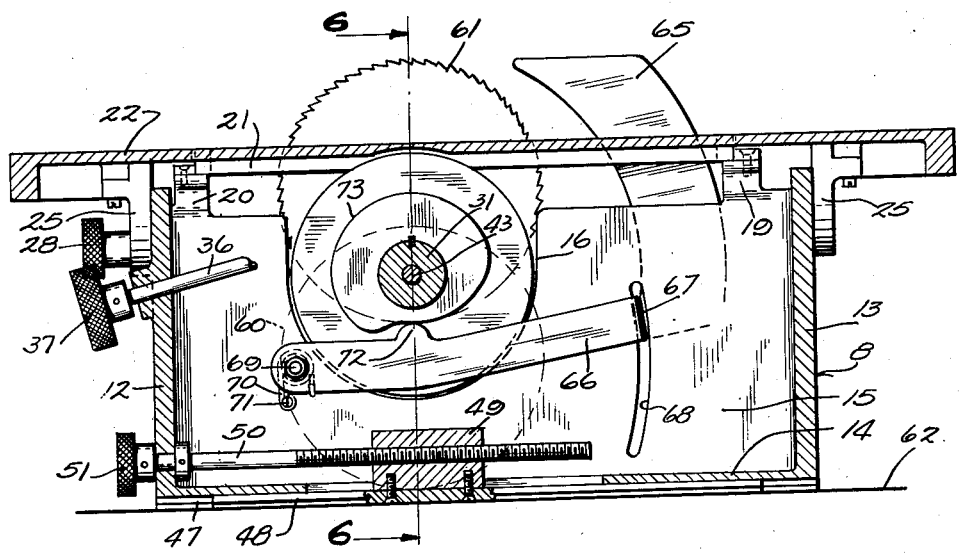
Fig. 4 is a view taken in transverse section on the line 4—4 of Fig. 1.

Journaled in the hub 31 is the drive shaft 43 which is equipped with an exposed pulley 44 to be driven by belt 45 from a suitable motor 46. For tightening the belt, the bottom wall 14 of the base frame may be provided with ways at 47 for a T-shaped anchor plate 48 screwed to the bench (Fig. 1) and having an upstanding lug at 49 tapped to receive the adjusting screw 50. The screw has a knurled head at 51 for its manipulation (Figs. 2 and 4).

The sub-frame 32 comprises a pan-shaped housing having a closure 53 in the form of a flange on hub 31. Within the housing the drive shaft 43 carries a sun gear 55 meshing with planetary gears 56, 57 mounted respectively on the arbor shafts 58, 59 which are journaled in the housing and project therefrom in substantial parallelism with the drive shaft and with each other to support the cross cut saw 60 and the rip saw 61, respectively. It is important to note that the arbor carrying saw 60 is extended to a slightly greater axial distance beyond the sub-frame housing 32 than the arbor which carries the blade 61, so that the respective saws are axially offset. It is further noteworthy that the two arbors are spaced for a distance which only slightly exceeds the radius of either blade. Thus, the saws lap each other and each of them extends well beyond the axis of the drive shaft 43 about which the saws move in the course of the indexing adjustment of the sub-frame 32. This arrangement results in an extremely compact organization and, as above noted, the surface of the work table 22 is only slightly higher above the work bench 62 than the diameter of either of the saw blades.

The surface of the slotted guide member 21 preferably lies flush with the surface of the work table 22 in the horizontal position of the table. However, the guide member 21 remains stationary when the table is tilted to the position shown in dotted lines in Fig. 1. In effect, that web 63 which lies to the left of the slot in member 21, as such member is viewed in Fig. 1, constitutes a partition which subdivides the table slot into two separate slots through which the respective blades are alternatively receivable. In effect, the two separate slots are slots in the table.

Both blades are in continuous operation when the drive shaft 43 is driven by motor 46. Without interrupting the operation of the motor, the sub-frame may be indexed to bring either of the blades through its respective slot to position for use. All that is required is to loosen the clamp bolt 36, rotate the crank wheel 41 to effect the indexing and reengage the clamp bolt 36 to maintain the indexed position of the sub-frame.

When the rip saw 61 is in use, it is desirable to provide a splitter for maintaining the severed parts of the work so separated as to be out of contact with the teeth of the rip saw blade. To this end, I provide a splitter 65 carried under the arm 66 which has an offset portion at 67 extending through an arcuate slot 68 in the partition wall 15. The arm 66 is fulcrumed on a post 69 set into the partition wall and encircled by a torsion spring at 70 which is anchored at 71 and biases the arm and splitter upwardly. The arm is provided at 72 with an integral cam follower which coacts with a cam 73 keyed to the hub 31 (Figs. 1 and 4) to partake of the indexing movement of the sub-frame and so designed that when the sub-frame is indexed to elevate the rip saw blade 61, a reduced radius of the cam 73 registers with cam follower 72 to allow the arm 66 to swing upwardly under bias of the spring 70, thus raising the splitter 65 to operative position as shown in Fig. 4. When the sub-frame is indexed to a position such that the rip saw blade is lowered within the frame housing 8 and a cross cut blade 60 is elevated to a position for use, the increased radius of cam 73 retracts the splitter against the bias of spring 70, as shown in Fig. 3.

Due to the fact that the work supporting saw guide and partition member 21 remain stationary, the table pivoting about an axis substantially coinciding with its partition web 63, it is possible to tip the table throughout its range of adjustment regardless of which saw is elevated in position for use.

From the foregoing, it will be understood that notwithstanding the simplicity and compactness of the device shown as a preferred example of my invention, all necessary adjustments are provided in a form which renders them easily and speedily operable.

I claim:

1. In a device of the character described, the combination with a main frame having a saw table provided with slot means, of a sub-frame mounted for indexing rotation in the main frame, saw arbor shafts rotatable in the sub-frame, and saws mounted on the arbor shafts to be selectively projected through the slot means of the table in the indexing of the sub-frame, the said saws comprising blades axially offset on the respective arbor shafts and peripherally lapping each other for compactness.

2. The device of claim 1 in which said slot means comprises slots individual to the respective saws and separated by an intervening partition web.

3. The device of claim 2 in which the table has a slot wide enough to receive both of said saws, and said partition web comprises one side of a slotted guide element which is in registry with one of said saws, the last mentioned saw being adapted upon the indexing of the sub-frame to be projected through the slot of the guide element, and the other of said saws being adapted in the indexing of the sub-frame to be projected through the table slot outside of the guide element.

4. The device of claim 3 in which said guide element has a relatively fixed connection with the main frame, and the table has a tiltable connection with the main frame including ways arcuately concentric with a tilting axis extending longitudinally of said slot means and adjacent said partition web.

5. The device of claim 4 in which said sub-frame has a hub intermediate the arbor shafts and rotatably journaled in the main frame, in further combination with a drive shaft extending through said hub and provided with driving connections to the respective arbor shafts.

6. A device of the character described comprising the combination with a main frame and a sub-frame mounted on the main frame for indexing movement with respect thereto, a drive shaft provided with bearings, arbor shafts mounted on the sub-frame at different sides of the drive shaft and provided with driving connections from the drive shaft, and saw blades mounted on the respective arbor shafts in positions mutually offset axially and in mutually lapping relation, each of said blades extending peripherally across the projected axis of the drive shaft.

7. The device of claim 6 in which the respective blades had radii only slightly less than the clearance between the arbor shafts, the main frame being provided with a table and having a total height to the surface of said table which is only slightly greater than the diameter of either blade plus the diameter of the arbor shaft of the other blade.

8. The device of claim 7 in which the table is slotted to receive the blades selectively according to the indexing position of the sub-frame respecting the main frame.

9. The device of claim 8 in which the main frame is provided with a slotted guide element having an upper surface substantially flush with the horizontal upper surface of the table and positioned in the table slot and materially less in width than the table slot, one of said blades being receivable through the slot of the guide element and the other of said blades being axially offset from the last mentioned blade and receivable through the table slot beside the guide element when the sub-frame is indexed to elevate said offset blade.

10. The device of claim 9 in which the table and main frame are provided with guide means upon which the table is tiltable upon an axis extending longitudinally adjacent the guide element and between the positions of use of the respective blades.

11. The device of claim 10 in further combination with a splitter in pivotal connection with the frame first mentioned and normally positioned below the table, said sub-frame and splitter having coacting cam and cam follower means for the automatic operation of the splitter in the course of the indexing of the sub-frame.

12. The device of claim 11 in which the splitter has a spring biasing it for movement from one direction, the said cam and cam follower means being arranged to actuate it in the opposite direction against the bias of the spring.

13. The combination with a main frame, of an indexing sub-frame and rip and cross cut saw blades provided with arbor shafts operatively mounted on the sub-frame for indexing movement therewith to and from operative position, the main frame having a slotted table through which said blades respectively project when indexed to operative position, and a splitter having an arm pivotally conected with the main frame and oscillatory to accommodate movement of the splitter to and from operative position behind one of said blades, the said arm being biased in one direction of oscillation and the said arm and sub-frame having complementary cam and cam follower means operatively engaged for the oscillation of the splitter in the opposite direction in opposition to its bias, the splitter being automatically moved by its bias and said cam and cam follower means in accordance with the indexing movement of the sub-frame to be projected in the course of the elevation of the blade behind which it functions and to be retracted when said last mentioned blade is indexed to inoperative position.

14. In a device of the character described, the combination with a saw table provided with a slot and a saw operatively mounted in said slot, the said slot being elongated at the rear of the saw, of a splitter movable through said slot, an arm upon which said splitter is mounted, a guide upon which said arm and splitter are movable between an advanced position and a retracted position, the said splitter projecting through the slot in its advanced position and being retracted below the table in its retracted position, and means for effecting movement of said splitter from one of said positions to the other.

15. The combination of claim 14 in further combination with a sub-frame mounted for indexing movement beneath the table and provided with an arbor upon which said saw is rotatable, the said means for actuating the splitter comprising a motion transmitting connection from said sub-frame to said arm for the mechanical actuation of said splitter in accordance with the movement of said sub-frame.

16. In a device of the character described, the combination with a saw frame having a slotted table, of a sub-frame rotatably mounted on said frame beneath said table for indexing movement, an arbor carried by the sub-frame, a rip saw blade rotatably mounted on the arbor for movement through and from said slot in the course of the indexing movement of the sub-frame, a splitter movable through and from the slot, guide means pivotally connected with said frame and upon which said splitter is mounted for such movement, and a motion transmitting connection from the sub-frame to the splitter for the mechanical actuation thereof in synchronism with the movement of said sub-frame, the said splitter being projected through said slot when the indexing movement of the sub-frame projects the rip saw through the slot and being retracted through the slot when the indexing movement of the sub-frame retracts the rip saw from the slot.

HYMAN M. HARRIS.

No references cited.